US010329782B1

(12) United States Patent
Burk

(10) Patent No.: US 10,329,782 B1
(45) Date of Patent: Jun. 25, 2019

(54) ISOLATOR OVERTRAVEL PROTECTION FOR WALK-BEHIND FLOOR SCRAPER

(71) Applicant: NATIONAL FLOORING EQUIPMENT, INC., Minneapolis, MN (US)

(72) Inventor: Matthew C. Burk, Forest Lake, MN (US)

(73) Assignee: National Flooring Equipment, Inc., Minneapolis, MN (US)

( * ) Notice: Subject to any disclaimer, the term of this patent is extended or adjusted under 35 U.S.C. 154(b) by 0 days.

(21) Appl. No.: 15/842,132

(22) Filed: Dec. 14, 2017

(51) Int. Cl.
*B32B 38/10* (2006.01)
*E04G 23/00* (2006.01)
*B26D 3/28* (2006.01)

(52) U.S. Cl.
CPC ............ *E04G 23/006* (2013.01); *B26D 3/28* (2013.01)

(58) Field of Classification Search
CPC ...... F16B 5/0241; F16B 5/025; F16B 5/0258; F16F 13/14; F16F 13/1409; E04G 23/006
USPC .... 248/638, 658; 267/136, 140, 140.13, 141
See application file for complete search history.

(56) References Cited

U.S. PATENT DOCUMENTS

| | | | | | |
|---|---|---|---|---|---|
| 1,864,080 | A * | 6/1932 | Madge | F16F 1/445 | 267/141.4 |
| 2,684,025 | A * | 7/1954 | Kurth | F24F 13/062 | 248/159 |
| 2,687,270 | A * | 8/1954 | Robinson | F16F 1/362 | 248/565 |
| 3,510,137 | A * | 5/1970 | Freier | G11B 33/08 | 248/638 |
| 4,040,590 | A * | 8/1977 | Baratoff | F16F 15/02 | 188/268 |
| 4,053,958 | A * | 10/1977 | Taylor | E04G 23/006 | 15/93.1 |
| 4,162,809 | A | 7/1979 | Anderson et al. | | |
| 4,626,033 | A | 12/1986 | Anderson | | |
| 4,963,224 | A | 10/1990 | Anderson | | |
| 5,040,953 | A * | 8/1991 | Tinsler | F16F 1/377 | 248/632 |
| 5,490,356 | A * | 2/1996 | Kemeny | E04H 9/022 | 248/632 |
| 6,135,566 | A | 10/2000 | Anderson | | |
| 7,416,244 | B2 * | 8/2008 | Polk | B62D 33/0604 | 248/638 |
| 8,317,173 | B2 * | 11/2012 | Kawada | F16F 1/40 | 248/575 |

* cited by examiner

*Primary Examiner* — Janine M Kreck
(74) *Attorney, Agent, or Firm* — Dewitt LLP; Thomas J. Nikolai

(57) ABSTRACT

An improved walk-behind floor scraper incorporates a plurality of isolators between a main plate and cutting head to reduce vibration and a plurality of stops to prevent damage to the isolators.

12 Claims, 5 Drawing Sheets

FIG. 3
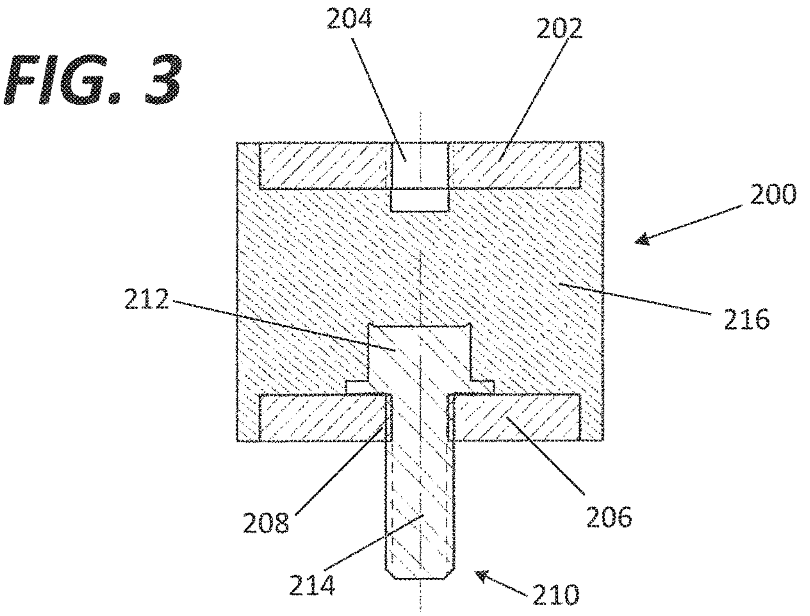
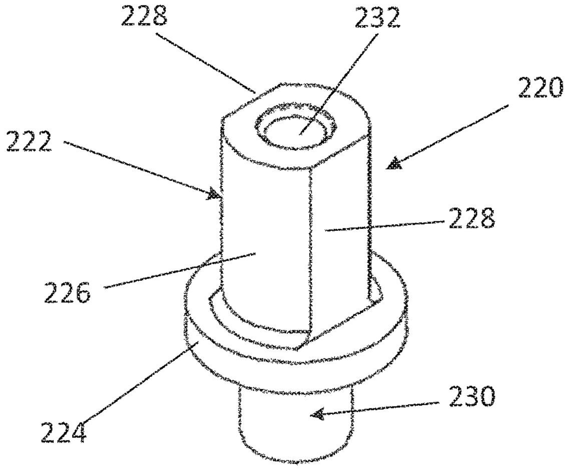
FIG. 4
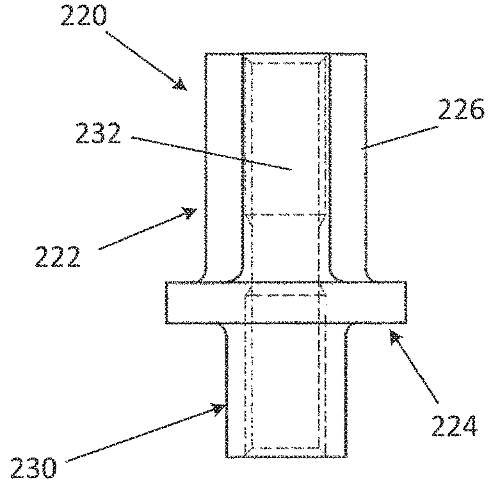
FIG. 5

ISOLATOR OVERTRAVEL PROTECTION FOR WALK-BEHIND FLOOR SCRAPER

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates generally to machines for stripping floor coverings from a floor, and more specifically improvements to protect from damage the elastomeric shock mounts employed on walk-behind floor stripping machines to reduce vibration while permitting orbital movement of the machine's cutting blade.

II. Related Art

In 1979, U.S. Pat. No. 4,162,809 was awarded on a motorized carpet and tile stripping machine that comprised a box-like housing mounted on a pair of wheels disposed near the rear of the housing and a cutting blade projecting outwardly from the front of the housing. The blade was adapted to engage the floor beneath a floor covering that had been adhesively bonded to the floor. The housing supported an electric motor having an output shaft that was coupled to the machine's cutting head by means of an eccentric drive shaft. Thus, the motor caused the cutting head to move in an orbital or elliptical pattern. An elongated handle was affixed to the upper deck of the housing and sloped rearward and upward terminating in handle grips. Machines made in accordance this patent proved to be effective in operation. However, such machines required a high degree of manual effort. The machines also vibrated excessively making the machines very difficult to control.

The problem of control was solved by the invention described and claimed in U.S. Pat. No. 4,626,033. This patent discloses a motion-retainer bar assembly between the machine's frame and cutting head's drive bar to modify the degree of eccentricity between the drive bar and the shaft of the electric drive motor. While the inclusion of this retainer bar made it easier to control the machine, vibration continued to be excessive. Also, while the machine adequately separated the floor covering from the floor, considerable adhesive residue remained on the floor.

An important invention to reduce vibration was disclosed in U.S. Pat. No. 4,963,224. This patent discloses a pair of OILITE® sleeve bearings and a pair of guide rods. These were employed to constrain the motion of the cutting head to reciprocatory, back-and-forth movement parallel to the path of travel of the machine. This invention reduced machine vibration and prolonged the useful life of the machine and minimized its meantime to repair. However, there was no improvement seen in the ability of the machine to remove adhesive residue from the floor following the stripping of the floor covering from the floor.

Yet another improvement was made which allowed the machine to do a better job removing adhesive residue from the floor. Specifically, U.S. Pat. No. 6,135,566 discloses a design which significantly increases the downward force of the machine's cutting blade against the floor by drastically increasing the overall weight of the machine thereby improving the ability of the machine to remove adhesive residue. This additional weight, however, made it much more difficult for the operator to push the machine. The invention of U.S. Pat. No. 6,135,566 also solved this problem by providing a drive system for the machine in which the same motor used to drive the cutting blade also drives the machine's wheels, making the machine self-propelled and reducing the work effort required by the operator.

The foregoing describes the state of the art as it has existed over the last 20 years. Applicants' assignee has had significant commercial success selling machines based upon the inventions referenced above. However, one nagging issue remains with such machines. Specifically, the cutting head is mounted to the underside of the machine and driven by the eccentric. During normal operation, the sleeve bearings (also known as isolators) function well to permit oscillatory movement of the cutting blade relative to the machine while at the same time dampening vibration to an acceptable level. However, from time to time during a floor covering removal operation, obstacles are encountered. All too often, machine operators abuse and misuse the machine when they encounter obstacles. Some operators push on the machine to try to plow through the obstacle. Others try to use the machine like a pry bar in an effort to remove the obstacle. These action exert too much or the wrong kind of force on the cutting head, often beyond the load-carrying capacity of the isolators. Long term and repetitive excess stretching of the isolators through such action leads to tears and ultimate failure.

As described in U.S. Pat. No. 6,135,566, the isolators (resilient elastomeric shock-mount members) are constructed by injection molding the elastomeric member onto a steel mounting plate having drilled and tapped holes formed therein. The isolators are susceptible to failure when either of the plates separate from the elastomeric member or the elastomeric member fractures or tears. For the last 17 years, there has been no solution to this problem other than to instruct the machine operators not to push the machine through obstacles, not to run into walls or other obstacles, and not to use the machine to pry obstacles from the floor. Machine operators often ignore these instructions leading to failure of the isolators.

SUMMARY OF THE INVENTION

The present invention represents an improvement to machines of the type described above which protects the isolators from damage in the event the machine operator encounters an obstacle and does not proceed as instructed. Specifically, the present invention provides for a walk-behind floor stripping machine an assembly comprising a main body plate and a cutting head adapted for oscillatory movement of the cutting head relative to the main body plate. The cutting head is affixed to the bottom surface of the main body plate via a plurality of isolators, each isolator comprising a top plate and a bottom plate held in spaced apart relation by an elastomeric overmold member. The assembly also includes a plurality of stops. In certain embodiments of the present invention, each of these stops has a body portion comprising a base, a neck extending from the base, and a removable flange, such as a washer, adapted to be attached to the end of the neck opposite the body portion. The body portion is affixed to either the main body plate or the cutting head. The neck is adapted to extend through an opening in the other of the main body plate and the cutting head such that the stop generally resides between the main body plate and the cutting head. The flange is then attached to the neck to complete the assembly. The base and the flange are each broader than the opening through which the neck extends. As such, the base, the neck, and the flange of the stop cooperate with surfaces surrounding the opening to permit oscillatory motion of the cutting head assembly and, at the same time, limit flex and shear movement of the cutting head that could be damaging to the isolators.

The invention contemplates various improvements be made to the design of the isolators and the way they are mounted. In one embodiment, each isolator includes threaded openings in the top and bottom plate. These openings are adapted to receive the threaded shaft of a bolt. During assembly, one of the bolts is passed through an opening in the main body plate to secure the isolator to the main body plate and the other bolt is passed through an opening in the cutting head to join the isolator to the cutting head. In another embodiment, one of the bolts is positioned so that the head of the bolt is positioned between the two plates of the isolator and the shaft of the bolt extends through an opening in one of the two plates. The head of this bolt is encapsulated during the overmold step used to create the elastomeric overmold member. Still another improvement concerns pockets formed in the main body plate, the cutting head assembly, or both. Each of these pockets is adapted to receive an end of an isolator to provide further structural stability not only to preserve the integrity of the isolator, but also to help retain the elastic overmold member of the isolator in position relative to the plate of the isolator located in the pocket in the event the isolator begins to fail.

The stop may also have features beyond those described above. For example, the body portion of the stop may include opposing flattened sides to permit the body portion to be gripped during installation by a wrench or set of pliers. The stop typically includes a threaded channel that extends longitudinally the entire length of the stop. Alternatively, there can be a separate threaded recess at each end of the stop. In either case, the threaded channel (or the pair of threaded recesses) receives a pair of bolts. One of the bolts of the pair of bolts is adapted to couple the stop to either the main body plate (or the cutting head) and the other pair of bolts is adapted to couple the flange (or washer) to the stop.

The aforesaid features of the stop allow the cutting head and isolators to perform their intended function during normal operation. However, if the force on the cutting blade held by the cutting head becomes too great, the stop and flange will engage to prevent over-torqueing of the elastomeric portion of the isolator and thus prevent damage to the isolator.

BRIEF DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 3 is a cross-sectional view of an improved isolator;

FIG. 4 is a perspective view of a hardened stop;

FIG. 5 is a side view of the stop of FIG. 4 with the internal structures shown in dashed lines;

DESCRIPTION OF THE PREFERRED EMBODIMENT

Figure 1:
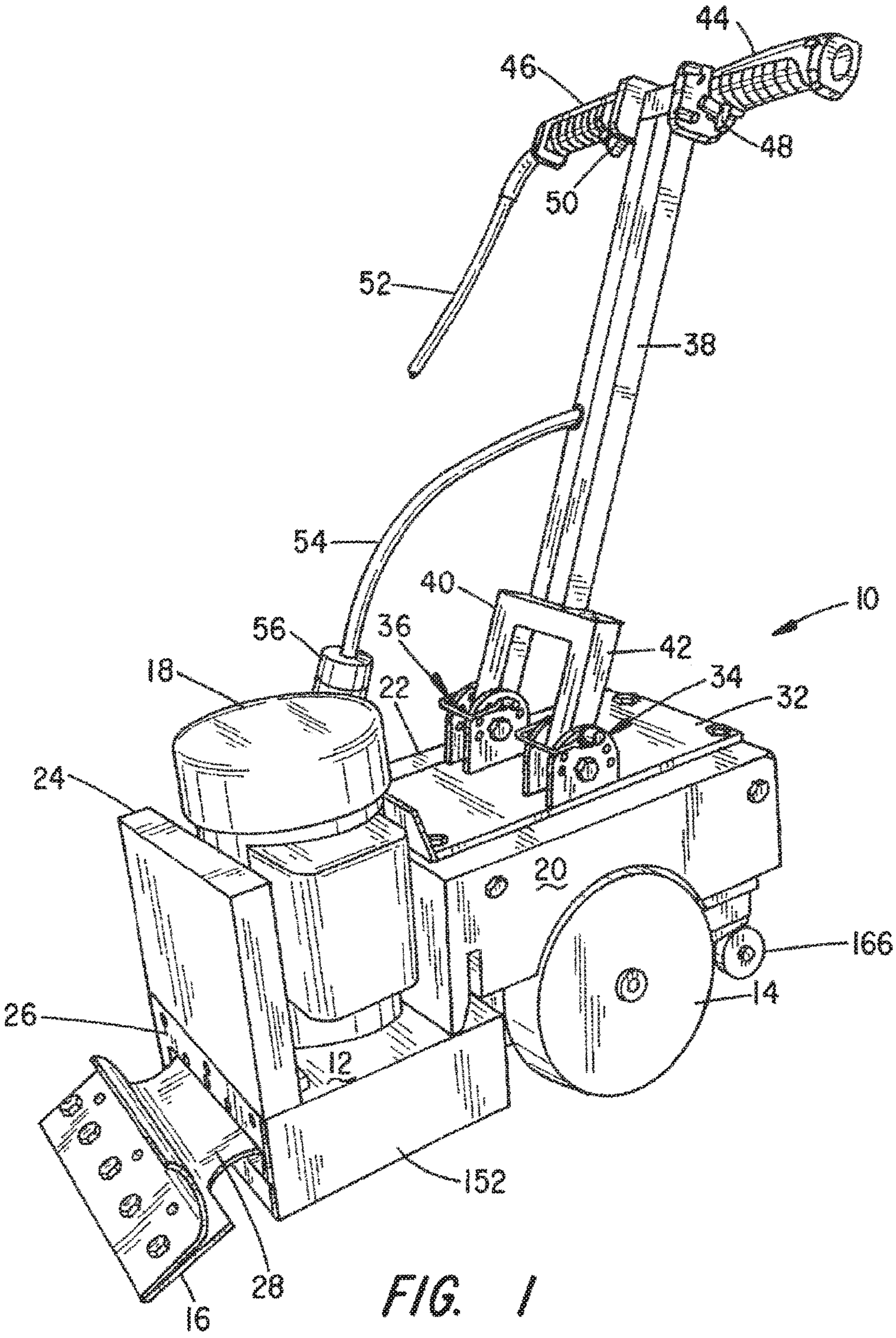
FIG. 1 PRIOR ART
FIG. 1 is a perspective view of the floor covering stripping machine shown in U.S. Pat. No. 6,135,566 representing the state of the prior art.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Figure 2:
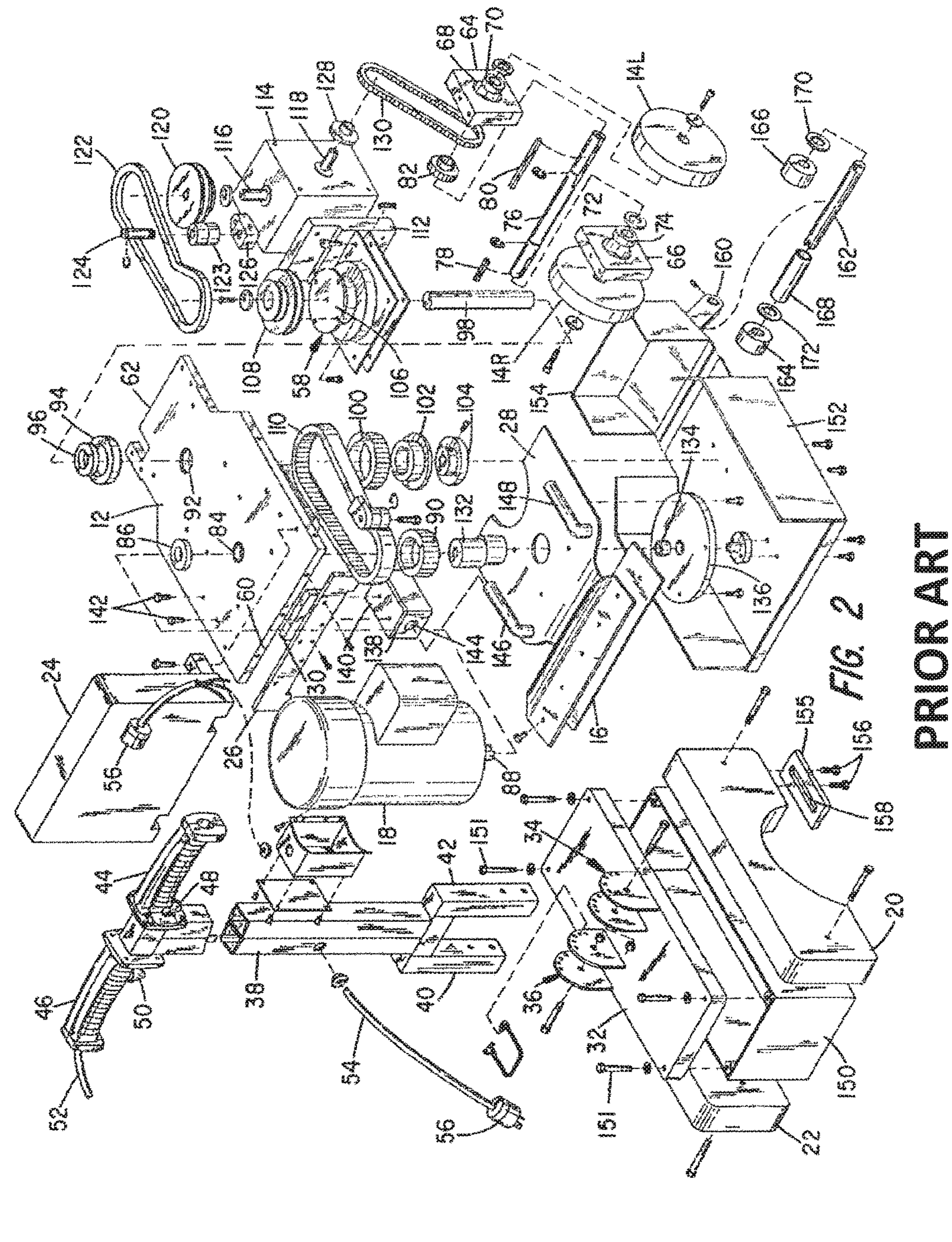
FIG. 2 PRIOR ART
FIG. 2 is an exploded view of the machine of FIG. 1 showing the construction thereof which, again, is representative of the prior art.

FIGS. 1 and 2 are reproduced from U.S. Pat. No. 6,135,566 granted to Martin L. Anderson and now owned by National Flooring Equipment, Inc. This patent, in its entirety, is incorporated by reference. FIG. 1 shows the exterior of a walk-behind, self-propelled floor stripping machine 10. The machine 10 includes a main body plate 12. Mounted on top of the main body plate 12 is an electric motor 18 that drives the wheels 14 and simultaneously oscillates the cutting head 28 which holds a floor-engaging cutting blade 16. To advantageously increase the weight of the blade, a front weight member 24 bolts to the main body plate 12. Likewise, heavy steel side plates 20 and 22 bolt to the housing (not shown). The housing contains the elements that impart motion from the motor 19 to both the wheels 14 and the cutting head 28. Extending upward and rearward of the housing is a handle 38 used by an operator to control the machine.

FIG. 2 shows the various components of the machine in exploded view. These are all described in detail in U.S. Pat. No. 6,135,566 and this entire description will not be repeated here. Of specific interest, however, is the manner in which the cutting head 28 is mounted beneath and to the main body plate 12.

Specifically, a pair of L-shaped slide rods 146 and 148 project upwardly and rearwardly from the top of the cutting head 28. Mounted to the bottom of the main body plate 12 are a pair of elastomeric shock-mount members 138 (only one of which is shown). The elastomeric members are injection molded onto steel mounting plates 140. Each of the elastomeric members 138 has a longitudinally extending bore 144 containing a self-lubricating seal bearing adapted to receive the L-shaped slide rods 146/148 which reciprocate within the bearings as the motor 18 drives the concentric shaft 132 to oscillate the blade 16.

FIGS. 3-8 show a novel alternative arrangement for attaching a cutting head 260 to a main body plate 240. The arrangement shown in FIGS. 3-8 incorporates cylindrical isolators 200 to isolate and dampen vibration and stops 220 to prevent damage to the isolators 200 due to excessive forces applied to the cutting head member.

FIG. 3 shows, in cross-section, one of the isolators 200. As shown, each isolator 200 includes a metal top plate 202. The metal top plate 202 includes a central threaded orifice 204. Isolator 200 also includes a metal bottom plate 206 having a central orifice 208. Isolator 200 further includes a bolt 210 having a head 212 positioned between plates 202 and 206 and a threaded shaft 214 extending through the central orifice 208 of the bottom plate 206. Finally, the isolator 200 includes an elastomeric rubber or rubber-like material 216 over-molding the plates 202, 206 and the head 212 of bolt 210.

FIGS. 4 and 5 illustrate one of the stops 220. The stop has a body portion 222 with a round base 224 and a side wall 226 having opposing flattened portions 228. Projecting from the body portion 222 is an elongate neck 230. Neck 230 has a smaller diameter than the diameter of base 224 of the body portion 222.

Extending longitudinally through the stop 220 and open to the top of the body portion 222 and the bottom of the neck 230 is a threaded channel 232. The threads may extend the entire length of channel 232 or the threads may only be present in the top and bottom sections of the channel 232. Alternatively, the body portion 222 and the neck 230 can be provided with central threaded recesses, one extending inwardly from the top of body portion 222 and the other extending inwardly from the bottom of neck 230.

Figure 6:
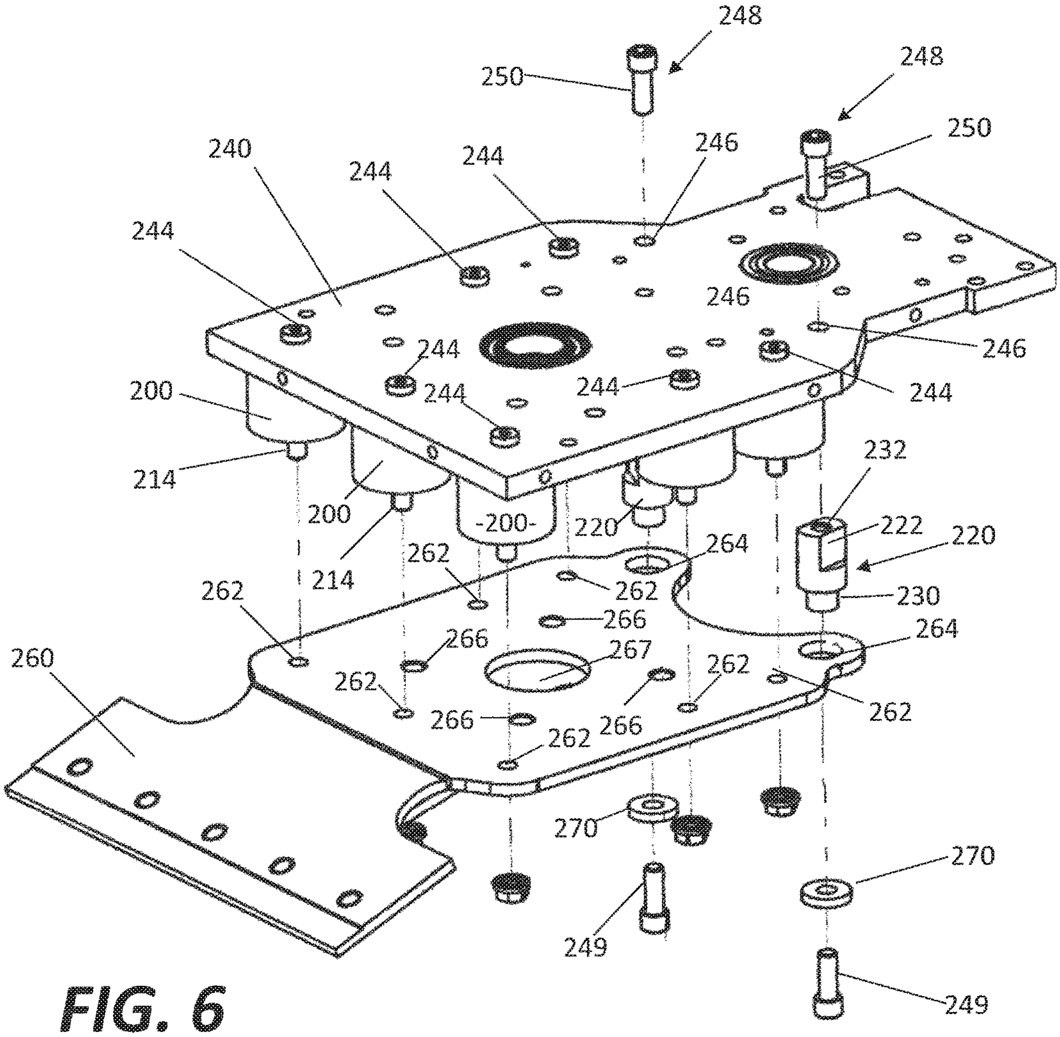
FIG. 6 is an exploded perspective view of an assembly including a base plate, a cutting head, a plurality of isolators and a plurality of hardened stops made in accordance with the present invention.
Figure 7:
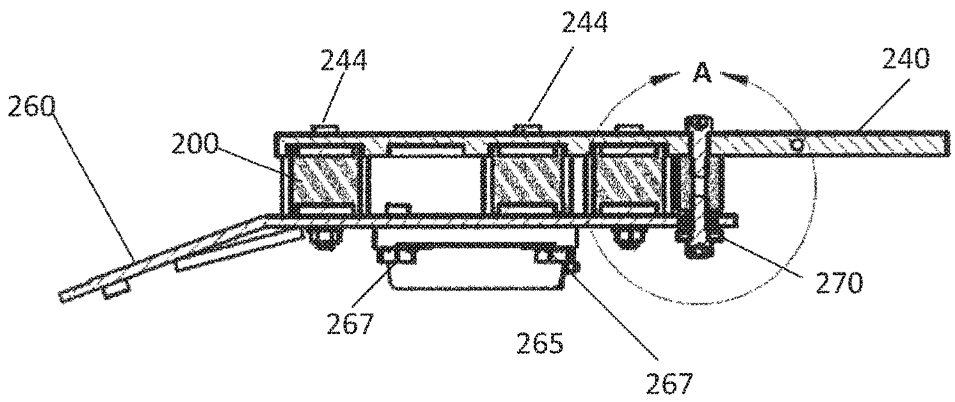
FIG. 7 is a cross-sectional view of the assembly of FIG. 6.
Figure 8:
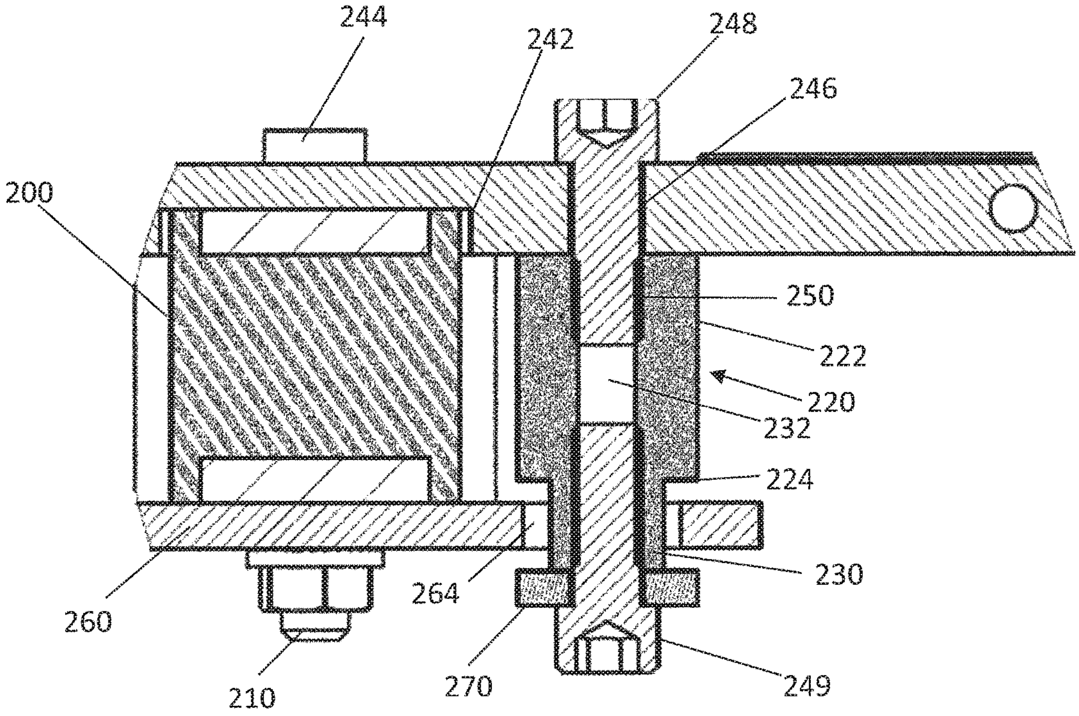
FIG. 8 is a more detailed cross-sectional view of the portion of FIG. 7 labeled "A".

FIGS. 6-8 illustrate how a plurality of isolators 200 and a plurality of stops 220 are employed in combination with nuts, bolts and washers to join a main body plate 240 and a cutting head member 260 together. In the embodiment of FIG. 6, seven isolators 200 are employed, only five of which are shown. Two stops 220 are also employed.

As illustrated in FIGS. 7 and 8, the bottom of the main body plate 240 is provided with separate receiver pocket 242 for each isolator 200. The receiver pocket 242 is slightly larger in diameter than the top of the isolator 200 such that the receiver pocket 242 is adapted to receive the top of an isolator 200 and limit lateral movement of the isolator 200. Extending through the main body plate 240 at the center of each pocket 242 is a passageway so that the threaded shaft of a bolt 244 can pass through the main body plate 240 and be inserted into the threaded orifice 204 of the top plate 202 of the isolator 200 to couple the isolator 200 to the main body plate 240.

After all the isolators 200 are coupled to the main body plate 240, the stops 220 are coupled to the main body plate in a similar fashion. Specifically, the main body plate 240 also has holes 246 adapted to receive the threaded shaft 250 of a bolt 248. The top of the body portion 222 of a stop 220 is aligned with a hole 246 and the end of shaft 250 is then passed through the hole 246 and into the threaded channel 232 to couple the stop 220 to the main body plate 240. A wrench or pliers can grip the opposing flattened portions 228 of the stop 220 to assist in tightening the stop 220 relative to the main body plate 240 and bolt 248.

As best illustrated in FIG. 6, the cutting head 260 has three different sets of holes. Holes 262 are adapted to receive the threaded shafts 214 extending from the bottom of the isolators 200. Holes 264 are adapted to receive the necks 230 of the stops 220. The holes 264 are larger in diameter than the necks 230, but smaller in diameter than the base 224 of the body 222. Holes 266 receive bolts 267 used to couple bearing 265 to the cutting head 260. Hole 267 receives an eccentric shaft such as 132 (see FIG. 2) that cooperates with the motor 18 and is joined to bearing 265 to impart oscillatory motion to the cutting head 260.

After all the isolators 200 and stops 220 have coupled to the main body plate 240, the threaded shaft 214 of each isolator 200 and the neck 230 of each stop 220 is passed through the above-described holes 262/264 of the cutting head 260. Nuts 215 are then coupled to each of the threaded shafts 214 of each isolator. Also, a bolt 249 is passed through a flange (e.g., washer) 270 which is tightened to the bottom end of the neck 230 by mating the threaded shaft of bolt 249 with the threads of channel 232 located in the region of the neck 230. The neck 230 is longer than the thickness of the cutting head member 260. As such, the cutting head member 260 is loosely sandwiched between the flange 270 and the base 224 of the body 222 of stop 220. Likewise, because the neck is narrower than the diameter of the holes 264, some back and forth play is permitted.

Further assembly of the machine is completed generally as described in U.S. Pat. No. 6,135,566 with the assembly of the main body plate 240, the cutting head 260, the isolators 200 and stops 220 replacing the assembly of main plate 12, cutting head member 28 and shock mount members 138. Operation of the machine 10 is also much the same from an operator standpoint with several clear advantages. Some of these advantages are described below.

First, with the design shown in U.S. Pat. No. 6,135,566, excessive forces on the cutting head would, over time, cause the metal plate of the isolator to separate from the elastomeric member, essentially rendering the machine inoperable. With the present design, the stops 220 and washers 270 associated therewith engage and prevent further movement of the cutting head before similar damage to the isolators 200 can occur. More specifically, the stops 220 and washers 270 permit oscillatory motion of the cutting head, but limit excessive flex and shear movement that damage the isolators.

Second, the side walls of the pockets 242 limit side-to-side movement of the elastomeric member 216 relative to a plate 202 of the isolator 200 further reducing the risk of damage to the isolator 200.

Third, the stops 220 protect the isolators 200 from too great a force being applied to the cutting head 260. The stops 220 also protect the bearing 265, the eccentric shaft and other elements used to transfer motion from the motor to the cutting head 260.

Various modifications can, of course, be made considering the disclosure provided without deviating from the present invention. Thus, the disclosure is intended to be exemplary rather than limiting.

What is claimed is:

1. A walk-behind floor stripping machine comprising:

(a) a main body plate;

(b) a cutting head holding a cutting blade, said cutting head adapted for oscillatory movement relative to the main body plate and affixed to the bottom surface of the main body plate via a plurality of isolators, each isolator comprising a top plate and a bottom plate held in spaced apart relation by an elastomeric member;

(c) a motor coupled to the main body plate and adapted to impart oscillatory movement of the cutting head relative to the main body plate; and (d) a plurality of stops arranged and adapted to permit oscillatory movement of the cutting head relative to the main body plate and limit flex and shear movement of the cutting head when the cutting blade encounters an obstacle to protect the isolators from damage, each of said stops having a body portion comprising a base, a neck extending from the base, and a removable flange adapted to be attached to the end of the neck opposite the body portion, wherein the body portion is affixed to one of said main body plate and cutting head and said neck is adapted to extend through an opening in the other of said main body plate and cutting head, and wherein the base and the flange are each broader than the opening such that the base, neck and flange cooperate with surfaces surrounding the opening to permit oscillatory motion of the cutting head assembly, and limit flex and shear movement of the cutting head assembly damaging to the isolators.

2. The walk-behind floor stripping machine of claim 1 wherein each isolator further comprised a threaded opening in one of said top plate and bottom plate, said threaded opening adapted to receive the threaded shaft of a first bolt.

3. The walk-behind floor stripping machine of claim 2 wherein each isolator further comprises a second bolt having a head positioned between the top plate and the bottom plate and encapsulated by the elastomeric member, and a threaded shafted extending through the other of said top plate and bottom plate.

4. The walk-behind floor stripping machine of claim 3 wherein said second bolt is adapted to extend through an opening in the main body plate and be fitted with a nut to secure the isolator to the main body plate.

5. The walk-behind floor stripping machine of claim 4 in which the second bolt extends through an opening in the cutting head and is adapted to be fitted with a nut to secure the cutting head to the isolator.

6. The walk-behind floor stripping machine of claim 1 wherein the bottom surface of the main body plate includes a pocket adapted to receive the top of an isolator.

7. The walk-behind floor stripping machine of claim 1 wherein the top plate and a bottom plate of an isolator are made of metal.

8. The walk-behind floor stripping machine of claim 1 wherein the flange is in the form of a washer made of a hardened material.

9. The walk-behind floor stripping machine of claim 1 wherein the body portion of the stop includes opposing flattened sides.

10. The walk-behind floor stripping machine of claim 1 wherein the stop has a threaded channel.

11. The walk-behind floor stripping machine of claim 10 wherein said threaded channel is adapted to receive a pair of bolts, one of said bolts of said pair of bolts adapted to couple said stop to one of said main body plate and said cutting head and the other of said pair of bolts adapted to couple said flange to said stop.

12. A walk-behind floor stripping machine comprising:

(a) a main body plate;

(b) a cutting head holding a cutting blade, said cutting head adapted for oscillatory movement relative to the main body plate and affixed to the bottom surface of the main body plate via a plurality of isolators, each isolator comprising a top plate and a bottom plate held in spaced apart relation by an elastomeric member;

(c) a motor coupled to the main body plate and adapted to impart oscillatory movement of the cutting head relative to the main body plate; and (d) a plurality of stops arranged and adapted to permit oscillatory movement of the cutting head relative to the main body plate and limit flex and shear movement of the cutting head when the cutting blade encounters an obstacle to protect the isolators from damage, each of said stops having a body portion affixed to the bottom surface of the main body plate, said body portion having base, and a neck extending from the base through an opening in the cutting head, each of said stops further comprising a removable flange adapted to be attached to the end of the neck opposite the body portion, wherein the body portion is affixed to said main body plate and said neck is adapted to extend through an opening in the cutting head, and wherein the base and the flange are each broader than the opening such that the base, neck and flange cooperate with surfaces of the cutting head surrounding the opening to permit oscillatory motion of the cutting head, and limit flex and shear movement of the cutting head when the cutting blade encounters an obstacle to protect the isolators from damage.

* * * * *